US009182565B2

(12) United States Patent
Gimblet et al.

(10) Patent No.: US 9,182,565 B2
(45) Date of Patent: Nov. 10, 2015

(54) OPTICAL FIBER CABLES HAVING REVERSAL POINT BANDING AND METHODS OF MAKING THEREOF

(71) Applicants: Michael John Gimblet, Conover, NC (US); Julian Latelle Greenwood, III, Hickory, NC (US); Richard Steven Wagman, Hickory, NC (US)

(72) Inventors: Michael John Gimblet, Conover, NC (US); Julian Latelle Greenwood, III, Hickory, NC (US); Richard Steven Wagman, Hickory, NC (US)

(73) Assignee: CORNING CABLE SYSTEMS LLC, Hickory, NC (US)

( * ) Notice: Subject to any disclaimer, the term of this patent is extended or adjusted under 35 U.S.C. 154(b) by 0 days.

(21) Appl. No.: 13/664,715

(22) Filed: Oct. 31, 2012

(65) Prior Publication Data

US 2013/0058614 A1 Mar. 7, 2013

Related U.S. Application Data

(63) Continuation of application No. PCT/US2011/034749, filed on May 2, 2011.

(60) Provisional application No. 61/330,675, filed on May 3, 2010.

(51) Int. Cl.
*G02B 6/44* (2006.01)

(52) U.S. Cl.
CPC .............. *G02B 6/449* (2013.01); *G02B 6/4405* (2013.01); *Y10T 29/49826* (2015.01)

(58) Field of Classification Search
CPC ....... G02B 6/441; G02B 6/449; G02B 6/4413; G02B 6/4482
USPC .......................................................... 385/104
See application file for complete search history.

(56) References Cited

U.S. PATENT DOCUMENTS

| 4,993,804 | A | * | 2/1991 | Mayr et al. ................ 385/103 |
|---|---|---|---|---|
| 5,703,983 | A | * | 12/1997 | Beasley, Jr. ............... 385/104 |
| 5,729,966 | A | | 3/1998 | Grulick ..................... 57/293 |
| 5,745,628 | A | | 4/1998 | Benzel et al. ............. 385/104 |
| 5,809,194 | A | * | 9/1998 | Lovie ........................ 385/104 |
| 6,193,824 | B1 | * | 2/2001 | Einsle et al. .............. 156/53 |
| 6,314,713 | B1 | | 11/2001 | Fitz et al. ................... 57/293 |
| 6,856,748 | B1 | * | 2/2005 | Elkins et al. .............. 385/135 |
| 7,570,854 | B2 | * | 8/2009 | Keller et al. .............. 385/110 |

FOREIGN PATENT DOCUMENTS

| DE | 3637250 A1 | 5/1988 | ............ G02B 6/44 |
|---|---|---|---|
| EP | 0522320 A1 | 1/1993 | ............ G02B 6/44 |
| JP | 8027418 B1 | 3/1996 | ............ G02B 6/44 |

OTHER PUBLICATIONS

Patent Cooperation Treaty, International Search Report for International Application No. PCT/US2011/034749, Mailing Date Oct. 12, 2011; 4 pages.

* cited by examiner

*Primary Examiner* — Ryan Lepisto
*Assistant Examiner* — Erin Chiem
(74) *Attorney, Agent, or Firm* — William D. Doyle

(57) ABSTRACT

Discrete bands (60) are applied to switchback regions (50) of stranded cable cores (10) to secure the stranded tubes (20) prior to jacketing. The bands (60) obviate the need for complex processes such as the application of binder threads.

8 Claims, 2 Drawing Sheets

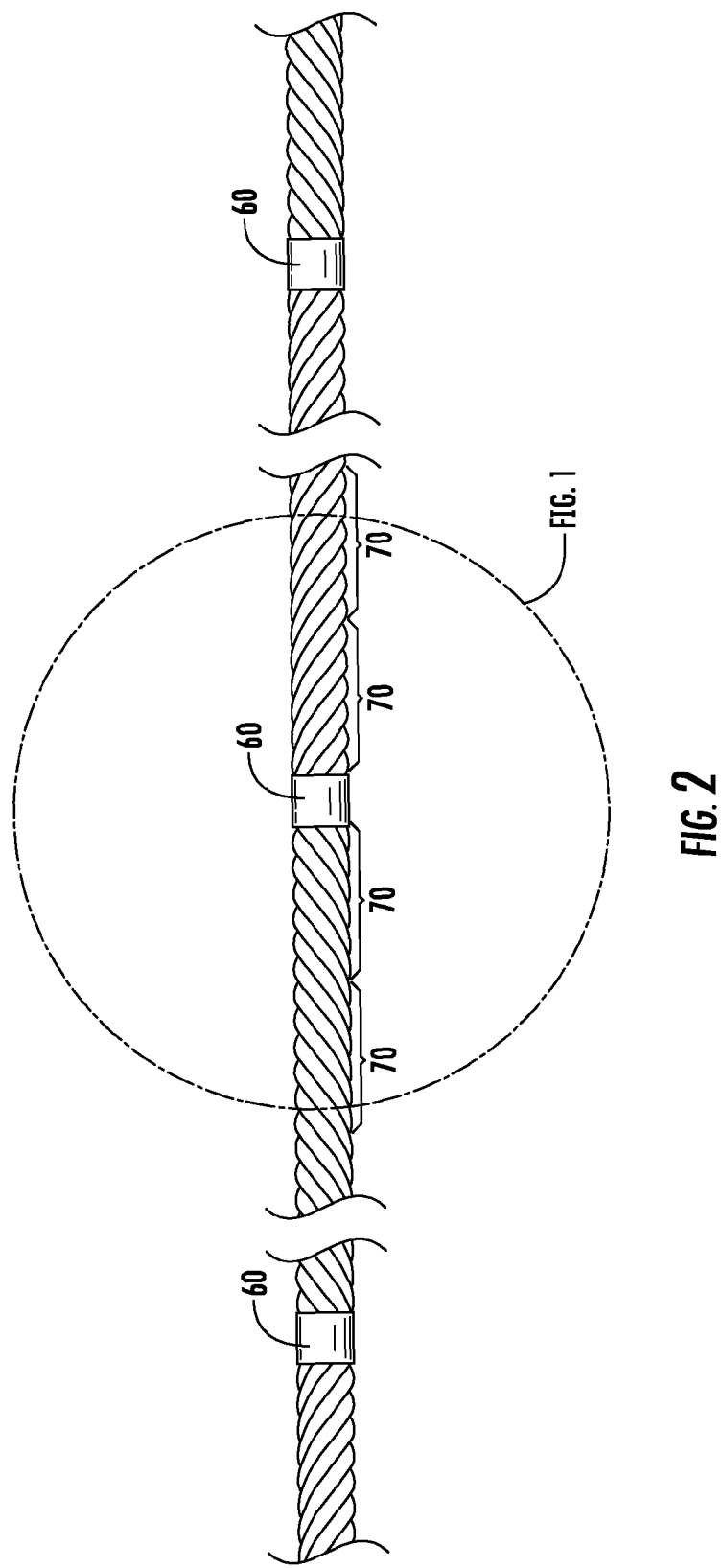

OPTICAL FIBER CABLES HAVING REVERSAL POINT BANDING AND METHODS OF MAKING THEREOF

BACKGROUND

This application is a continuation of International Application No. PCT/US11/34749 filed May 2, 2011, which claims the benefit of priority to U.S. application Ser. No. 61/330,675, filed May 3, 2010, both applications being incorporated herein by reference.

BACKGROUND

S-Z stranded cables, also known as reverse oscillating lay cables, include a group of buffer tubes helically stranded about a central strength member. The S-Z stranding of buffer tubes in an optical fiber cable may take several forms. Each 'S' turn may be followed immediately by a reversal to a 'Z' stranding direction. Alternatively, there may be several helical turns between reversals. The average lay length can be defined by the distance between reversal points divided by the number of turns between reversals. The direction or lay of the tubes periodically switches at reversal points or "switchback" locations. S-Z stranding facilitates access to the tubes at the reversal points in that there is more excess tube length to access at the reversal points.

S-Z cables are typically manufactured by stranding a plurality of dielectric buffer tubes around a strength member to form a cable core. The S-Z stranded cable core can then be forwarded to a jacketing line where a polymer jacket can be extruded over the core. Before jacketing, however, the core requires some means to secure the buffer tubes in their stranded position. The most common solution is to contrahelically wrap a pair of binder threads around the stranded core. The inclusion of contrahelically wrapped binder threads add cost and complexity to cable manufacture, as well as potentially reducing manufacturing line speeds. The binders must also be removed from an accessed section of the cable jacket in order to access a buffer tube.

Use of an adhesive central member to secure the buffer tubes in place has also been proposed, although this solution also increases complexity of manufacture.

SUMMARY

According to a first aspect, a method for making a communications cable comprises stranding a plurality of subunit communication elements with a repeating pattern of a first lay region, a second lay region, and a reversal region between an adjacent first lay region and second lay region, and applying a band about the stranded subunit communication elements at at least one reversal region. The band secures the cable so that it can have, for example, a jacket extruded over the cable.

According to another aspect, a cable comprises at least four subunit communication elements surrounded by the jacket, each subunit communication element comprising a tube containing one or more optical communication fibers, wherein the subunit cables are stranded in S-Z fashion, and at least one band extending around and contacting the stranded subunit communication elements at at least one reversal region in the S-Z stranding.

BRIEF DESCRIPTION OF THE DRAWINGS

The present invention is illustrated and described herein with reference to the various drawings, in which like reference numbers are used to denote like system/assembly components and/or method steps, as appropriate, and in which:

FIG. 2 is a side elevation of the cable core shown in FIG. 1.

DETAILED DESCRIPTION

Figure 1:
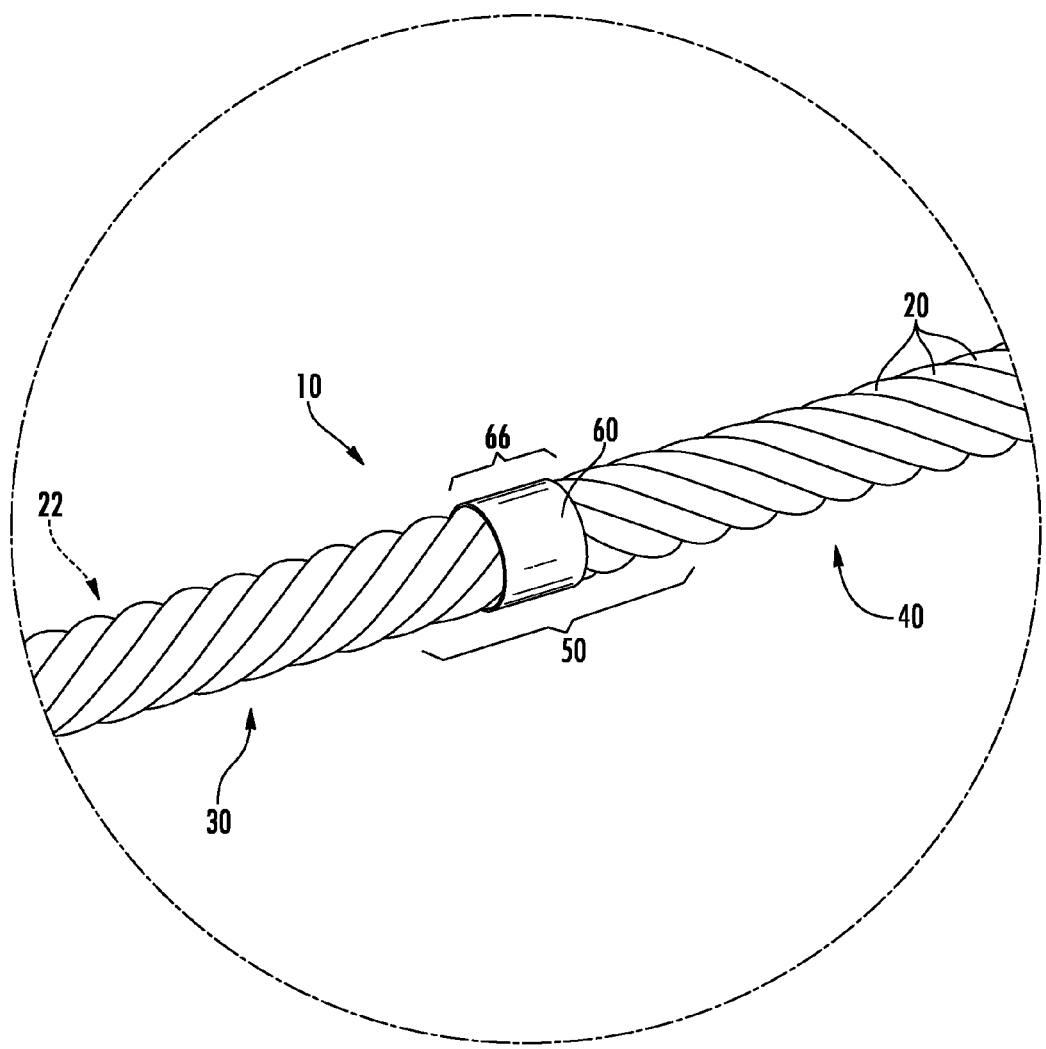
FIG. 1 is a partial perspective view of a section of a fiber optic cable core according to a present embodiment.

FIG. 1 is a partial perspective view of a cable, or cable "core" 10 according to a present embodiment, prior to jacketing. FIG. 2 is a side elevation of a larger section of the cable core 10. The article 10 can serve as an individual optical cable, or may be further described as a cable "core" if it is to be subjected to further processing, such as a jacketing operation. For example, a cable core 10 as shown in FIGS. 1-2 would typically be enclosed in a polymer cable jacket (not shown) extruded over the core 10. Elements such as water-swellable tapes (not shown) can be wrapped around the core 10 prior to jacketing. For the purposes of this specification, references to a "cable" are intended to encompass cable cores and cable cores subjected to further processing.

The cable core 10 includes a plurality of subunit communication elements, or simply "subunits" 20, wrapped around a central member 22, which is not visible in the figure. The subunits 20 can be, for example, buffer tubes comprised of a tube containing one or more optical communication fibers. Other data-conveying elements, such as electrically conductive members, could also be included in the subunits 20. The exemplary subunits 20 have annular polymer jackets of circular cross-section with one or more optical communication fibers extending therethrough. In this specification, the terms "polymer" and "polymeric" indicate materials comprised primarily of polymers, but allow for the inclusion of non-polymer additives and other materials, such as fire-retardant compounds, etc., and the inclusion of multiple polymers in a blend.

Referring to FIG. 1, the subunits 20 are arranged in a repeating pattern of a first lay orientation region 30, a second lay orientation region 40, and a reversal region 50 between the first and second lay orientation regions 30, 40. According to one aspect of the present embodiment, bands 60 secure the cable core in a wound configuration at the reversal regions 50, also known as switchback points.

The band 60 can be, for example, any member that extends around a circumference of the stranded subunits 20 to secure the subunits in their stranded orientation. The band 60 is intended to obviate the requirement for helically wound binder threads, adhesive central members, and other prior means used to secure wound subunits prior to jacketing. Since bands 60 need only be applied at the reversal regions, as few as four, three, or even two bands 60 may need to be removed to access the cable.

The band 60 can be of relatively short length 66—as measured along the length of the cable core 10. The length 66 can be, for example, less than 3 inches (7.6 cm) in width. In another embodiment, the length 66 is in the range of 2 inches (5.1 cm) to ¼ inch (0.6 cm). In the illustrated embodiment, the length 66 is one inch (2.54 cm).

In the exemplary illustrated embodiment, the bands 60 are adhesive tapes wrapped around the stranded subunits 20. A cable according to the present embodiments can be constructed using conventional cable manufacturing lines modified to apply a band 60 at each reversal region 50. A conventional extruder can be used to extrude the cable jacket after bands are applied at the switchbacks. Conventional lines that apply switchback marking labels, for example, can be adapted to apply the bands 60. Such lines, however, typically apply switchback marking indicia over helically wound binder threads that are used to maintain the lay of the buffer tubes. According to the present embodiments, bands 60 will be applied directly over the subunits 20 at reversal regions. Conventional stranding equipment can be modified with core banding equipment located at the tip (as the subunits 20 form around the central member 22).

In general, the centers of the bands 60, as measured along the axial length of the cable core 10, should be centered over their corresponding reversal regions 50. Some offset may be allowed, however. For example, each reversal region 50 can have a band 60 applied whose center is within +/−10 centimeters of a center of the reversal region.

If a wound tape is used to form the band, the tape can be wound so that it encircles the circumference of the core and contacts itself. Known methods for locating switchbacks for switchback marking applications can be used to time application of the bands 60. The bands 60 can have properties such as, for example, minimal or no shrinkage when heated by a subsequent jacket extrusion process.

As an alternative, the bands 60 could be formed from an elastic band that is released around the cable core at reversal regions to maintain the stranded form of the core. As another alternative, a band could be a heat-shrinkable band that is applied to the core during processing, and subsequently heated to secure the tubes. A UV curable material could also be applied to the core and then cured to secure the tubes at reversal regions. As another alternative, the bands could be strips of materials provide with hook and loop fastener attachment arrangement, such as VELCRO®.

As stated above, the bands 60 can be applied directly around and contacting stranded subunit buffer tubes 20, without requiring the use of binder threads around the buffer tubes, or the use of an adhesive central member. In the illustrated embodiment, there are no intervening elements such as binder threads or other binder elements between the bands and the stranded subunits 20.

FIG. 2 illustrates a larger section of the cable core 10 and shows multiple bands 60 securing reversal points in the stranding of subunits 20. As shown in FIG. 2, the core 10 includes six subunits 20. The cable core 10 can be manufactured so that several lay lengths 70 extend between successive or adjacent reversal regions. Accordingly, successive bands 60, which are placed at reversal regions, can be spaced apart by multiple lay lengths. For example, the spacing between successive or adjacent bands 60 may be such that the subunits 20 may undergo two or more lay lengths between successive bands 60. According to one embodiment, the tubes under go between four to ten lay lengths between bands.

It will be understood to the skilled artisan that the methods disclosed herein to control optical fiber position within a fiber optic cable are not mutually exclusive and may be used in any combination as required to achieve appropriate control of optical fiber position.

What is claimed is:

1. A cable, comprising:
   a jacket;
   a plurality of subunit communication elements surrounded by the jacket, each subunit communication element comprising a tube containing one or more optical communication fibers, wherein the subunit communication elements are stranded in S-Z fashion; and
   a plurality of non-helical bands, each band individually applied over a particular reversal region in the S-Z stranding and contacting only the stranded subunit communication elements of the particular reversal region such that the band secures the subunit communication elements in their stranded orientation, wherein successive bands are separated by multiple lay lengths of the subunit communication elements.

2. The cable of claim 1, wherein each band and the reversal region have lengthwise centers along the axial length of the cable, and wherein the center of each band is within 10 centimeters of the center of the reversal region.

3. The cable of claim 1, wherein the non-helical bands are applied such that there are no intervening elements between the bands and the stranded subunit communication elements.

4. The cable of claim 1, wherein successive bands are separated by two or more lay lengths of the stranded subunit communication elements.

5. The cable of claim 1, wherein each band comprises strips of material having a hook and loop fastener attachment arrangement.

6. The cable of claim 1, wherein each band is a heat-shrinkable band that is heated to secure the subunit communication elements.

7. The cable of claim 1, wherein each band is an elastic band.

8. The cable of claim 1, wherein each band is formed from a wound tape.

* * * * *